United States Patent [19]

Mitchell, III

[11] 4,012,337
[45] Mar. 15, 1977

[54] HIGH SURFACE AREA ALPHA ALUMINAS

[75] Inventor: Howard Lee Mitchell, III, Baton Rouge, La.

[73] Assignee: Exxon Research and Engineering Company, Linden, N.J.

[22] Filed: July 7, 1975

[21] Appl. No.: 593,844

Related U.S. Application Data

[62] Division of Ser. No. 450,767, March 13, 1974, abandoned.

[52] U.S. Cl. ............................ 252/439; 252/441; 252/442; 252/463; 208/139
[51] Int. Cl.$^2$ .................. B01J 27/04; B01J 27/10
[58] Field of Search .......... 423/625, 628; 252/439, 252/441, 442, 463

[56] References Cited
UNITED STATES PATENTS

| | | | |
|---|---|---|---|
| 2,964,480 | 12/1960 | Schwartz | 252/439 |
| 3,151,175 | 9/1964 | Goldsmith | 252/439 X |
| 3,224,962 | 12/1965 | Baldwin | 252/439 X |
| 3,296,119 | 1/1967 | Bicek | 252/439 X |
| 3,439,061 | 4/1969 | Henderson et al. | 252/439 X |
| 3,672,831 | 6/1972 | Duecker et al. | 423/628 |
| 3,850,849 | 11/1974 | Kiovsky et al. | 252/463 |

*Primary Examiner*—Patrick P. Garvin
*Attorney, Agent, or Firm*—Llewellyn A. Proctor

[57] ABSTRACT

Alpha alumina, as a new composition of matter, particularly suitable as a support for catalyst compositions (especially reforming catalysts), having surface areas in excess of 75 m$^2$/g (B.E.T), ranging preferably from 100 m$^2$/g to 600 m$^2$/g, and higher, and more preferably from 150 m$^2$/g to 400 m$^2$/g. A novel process is also described wherein these novel alpha alumina compositions are formed from hydrated beta alumina, especially $\beta$-Al$_2$O$_3$·H$_2$O, at critical low-temperature, low water-vapor pressure conditions, preferably also at low system pressure or under vacuum. The alpha alumina is particularly useful as a support for a Group VIII noble metal reforming catalyst.

9 Claims, No Drawings

HIGH SURFACE AREA ALPHA ALUMINAS

This is a division of application Ser. No. 450,767, filed Mar. 13, 1974, now abandoned.

Aluminum oxide, or alumina, in several forms (anhydride or hydrated, crystalline or amorphous), has been known for many years. Various forms of aluminum oxide occur in nature, and many have been produced synthetically. Certain forms of alumina have proven outstanding for use as carriers or supports in forming catalysts, and it is virtually universally used in the petroleum refining industry. The gamma form of alumina, composited with a nobel metal, or mixture of such metals with each other or with other metals, e.g., has been widely used in reforming because, inter alia, of its high surface area, heat stability, and surface acidity, and because it can be prepared in very pure form.

Alumina usually occurs in nature in hydrous form. Known forms include, e.g., boehmite, $\beta$-$Al_2O_3$·$H_2O$ (beta alumina monohydrate), or diaspore, and such trihydrate forms as bayerite-I, bayerite-II (randromite), gibbsite and the like. Alumina can be dehydrated by application of heat, e.g., by heating in an autoclave or furnace.

Alpha alumina (corundum), a very stable form of alumina of negligible surface area has been known for many years. It occurs in nature, and has been produced synthetically in various ways. F. Haber [*Naturwiss* 13:1007(1925)] thus early described the preparation of high purity $\alpha$-$Al_2O_3$ from aluminum hydroxides and aluminum oxides at temperatures above 1200° C. The $\alpha$-alumina was found to be virtually insoluble in alkalies and acids, and had a surface area of less than 3 $m^2$/g (B.E.T.). Alpha alumina is reported also to have been formed from pure bayerite or boehmite at temperatures above 1200° C., and even at lower temperatures from very high purity bayerite. From phase diagrams reported in the literature, it also appears possible to prepare alpha alumina from diaspore at temperatures as low as about 300° C., provided the diaspore is very pure. Alpha alumina has also been prepared from aluminum hydroxides or oxides at about 430° C. and higher, and from aluminum metal at temperatures above 320° C. under steam at elevated pressures [K. Torkar, Monatskefte F. Chemie 91(5): 757–63(1960)]. Pursuant to these techniques, the surface area of the alpha alumina has ranged as high as about 60 $m^2$/g (B.E.T.). Various other methods for the preparation of alpha alumina are known in the art, e.g., as described in communications published by K. Torkar and H. Krischner (Institute of Physical Chemistry of Groz Technische Hochschule—lecture held by H. Krischner on the Anniversary of the Deutsche Keramische Gesellschaft in Koln/ Rhein, Oct. 4, 1961) and by M. J. Ruthner (Ruthner Engineering A.G. A-1121 Wien Austria) and H. Krischner. Insofar as known, however, alpha alumina has never been produced with surface area greater than about 60 $m^2$/g (B.E.T.).

Alpha alumina is, in a sense, the end product of aluminum oxide transformations and it is well known that other forms of alumina can be converted to alpha alumina. It is widely available and can be prepared in very pure form. Alpha alumina is also highly stable and for this reason, in particular, is widely used in the manufacture of ceramics. Alpha alumina, despite its wide availability and its unusually high stability, a property so highly desired in catalysis applications (particularly in petroleum refining operations which require high temperature treatments), is rarely if ever used as a catalyst component. The basic reason is simply that alpha alumina as it presently exists, unlike certain other forms of alumina, does not have sufficiently high surface area to make it attractive as a catalyst component.

Accordingly, it is the basic objective of this invention to obviate this deficiency of conventional alpha alumina.

Specifically, it is an object of this invention ot provide a novel process for the preparation of new and novel forms of high surface area alpha alumina.

In particular, it is an objective of the present invention to provide new and novel alpha alumina compositions of high surface area, admirably suitable as catalyst components, particularly as carriers or supports for admixture with catalytically active components; and including, particularly, catalyst compositions produced by incorporation or admixture of the high surface area alpha alumina with active components, especially metal hydrogenation-dehydrogenation components, to produce catalysts useful in petroleum refining operations.

These objects and others are achieved in accordance with the present invention which embodies a process wherein a hydrated form of $\beta$-$Al_2O_3$ (beta alumina), preferably $\beta$-$Al_2O_3$·$H_2O$ (beta alumina monohydrate), can be heated, in a moisture-deficient atmosphere, or atmosphere which contains a partial pressure of water no greater than about 760 Torr, and preferably no greater than about 10 Torr, at temperatures above about 100° to about 1000° C., preferably from about 400° to about 800° C., for a time sufficient to produce new and novel high surface area alpha alumina compositions, or compositions having a surface area greater than about 75 $m^2$/g (B.E.T.), and preferably above about 100 $m^2$/g.

In a preferred process for the production of high surface area alpha alumina, $\beta$-$Al_2O_3$·$H_2O$ is used as a starting material, and the $\beta$-$Al_2O_3$·$H_2O$ is heat-treated at temperatures ranging from about 300° to about 600° C., preferably from about 400° to about 500° C., while maintaining the ambient water vapor pressure less than about $10^{-1}$ Torr, and preferably about $10^{-3}$ Torr or lower. The low moisture atmosphere maintained during the treatment is absolutely essential whether the treatment is conducted at elevated total pressure, at reduced total pressure, or under vacuum, the latter of which is particularly preferred, and whether or not the treatment is conducted within a static atmosphere or a flowing stream of an inert or nonreactive gas. Hydrogen and helium have been found particularly effective as diluents and/or carrier gases in such treatments, and hence these gases are preferred, e.g., to $N_2$ or air or other gases. Preferably, the treatment is conducted at reduced total pressure or in a vacuum, preferably at pressures ranging from about $10^{-1}$ to about 10 Torr differential pressure, and more preferably from about $10^{-4}$ to about 1 Torr. Pursuant to these conditions, the $\beta$-$Al_2O_3$·$H_2O$ is transformed to high surface area alpha alumina, suitably surface areas ranging from about 100 $m^2$/g to about 600 $m^2$/g, preferably from about 150 $m^2$/g to about 400 $m^2$/g, water being eliminated from the material during the transformation.

The time-temperature relationship is an important consideration in the conduct of the present process. The lower the temperature, the slower the reaction proceeds. At temperatures below about 300° C., the time required to eliminate water from β-alumina monohydrate and form high surface area alpha alumina is extremely slow, so slow as to be impractical. The expressed higher temperature range appears about optimum, and generally only a few days are required to eliminate water from the hydrated alumina and produce the high surface area alpha alumina when the process is operated under vacuum. Higher temperature causes elimination of the water to produce alpha alumina, with or without a vacuum, but too high temperature, in the presence of water vapor, reduces surface area, and results in an alpha alumina with surface area ranging below 60 m²/g, and generally as low as 2 or 3 m²/g, or less, dependent on the specific conditions that are employed. In general, because water is being evolved when increasing the temperature, it is sufficient to raise the temperature such that the total pressure or water vapor pressure is below the desirable limits.

The reasons for the effectiveness of the present process in producing a high surface area alpha alumina are not known with certainty. Whereas applicant does not desire to be bound by any specific theory of mechanism, it is believed that the low temperature moisture-free environment that is established pursuant to the present process permits a very gradual evolution of water from the crystal, this leaving openings or pores which, in the low-temperature, low-water vapor pressure environment, do not tend to fuse or bridge over, sinter, agglomerate and close, as may occur at the more elevated temperatures and high moisture ambients of the prior art. Whatever the reasons, however, the process of this invention is admirably suitable for the formation of high surface area alpha alumina from hydrated beta alumina, particularly beta alumina monohydrate.

The high surface area alpha alumina is, as suggested, suitable as a carrier, support, or component for incorporation with catalytic materials, particularly a metal component, or metal components, as employed in the manufacture of catalysts for petroleum reforming operations. The high surface alpha alumina is thus suitable, e.g., as a carrier or support for Group VIB or Group VIII non-noble metals, or admixtures of these and other metals, or compounds thereof such as used in the production of heavy crude conversion and hydrodesulfurization catalysts exemplary of which are chromium, molybdenum, tungsten, nickel, iron and cobalt, and for incorporation with Group VIII noble metals, or mixtures of Group VIII noble metals and other metals, or compounds thereof, e.g., Group VIII nobel metals such as platinum, palladium, iridium, osmium, rhodium, ruthenium, and other metals often admixed therewith such as rhenium, tin, lead, germanium, silver, and the like, such as used in the production of reforming catalysts.

The metal, or metal components in the form of salts, can be composited, incorporated or intimately associated with the high surface area alpha alumina support by impregnation. Pursuant to the impregnation method, particulate alpha alumina in dry state is contacted, either alone or admixed with other materials, with a metal or metals-containing solution, or solutions, and thereby impregnated by an "incipient wetness" technique, or a technique embodying absorption from a dilute or concentrated solution, or solutions, or a combination of this technique with subsequent or simultaneous evaporation to effect total uptake of liquid. The catalyst is then dried. The alpha alumina can be of preselected size, or larger particles after impregnation can be crushed to form particles of desired size. In reforming, pellets or tablets 1/16 inch to ¼ inch in diameter and to about ½ inch in length are used in larger systems, and particles of size ranging from about 5 to about 200 mesh (Tyler series), and preferably particles of about 1/10 to about 1/50 inch average diameter are used in smaller units. The support material can be treated by contact with a single solution containing the desired amounts of a metal, or metals, or treated sequentially by contact with a solution containing one or more metals, and then a solution which contains another metal, or metals, in the desired amounts. The catalyst from any preparative sequence, e.g., for reforming purposes, can then be dried, calcined, and contacted with hydrogen, or hydrogen sulfide, or both, in situ or ex situ, to reduce part or all of the metal salts and activate the catalyst.

It is generally desirable, and generally necessary to incorporate an acidic or isomerization component within a reforming catalyst, as by addition of halide, e.g., fluoride, chloride, bromide, iodide, and the like, particularly chloride, or fluoride, more preferably chloride, to control the rate of isomerization and cracking. The metals, if desired, and this is generally the case, can be added as halide salts during preparation of the catalysts to incorporate all or a portion of the desired halide. In either event, it is preferably to add halogen in concentration ranging from about 0.1 to about 2.5 percent, and more preferably from about 0.3 to about 1.5 percent, based on the total weight of the catalyst (dry basis).

The partially dried catalyst, after incorporation of the metals, and halogen, is then completely dried or calcined in nitrogen or other non-agglomerating medium, either in situ or ex situ, as related to the reactor in which the naphtha reforming reaction is to be carried out. The general method is to dry the catalyst in flowing nitrogen while raising the temperature stepwise to avoid too high a concentration of water vapor. The temperature is not critical, but is generally increased to 800°–1000° F. and the gas flow maintained until the catalyst is essentially completely dry. At this stage (or after the reduction, or during sulfiding), if it is desired to raise the halide concentration of the catalyst further, halogen, halogen halide or halide precursor can be contacted with the catalyst in gaseous form, in situ or ex situ. The catalyst is then reduced, generally with hydrogen or a hydrogen-containing gas, the metal, or metals, generally being reduced, or partially reduced, to the metallic state before the catalyst is subjected to reforming conditions. The reduction is generally carried out by passing the hydrogen through the zone of contact with the catalyst at sufficient velocity to rapidly sweep out the water vapor that is formed. The temperature of reduction is not especially critical, but is generally carried out in the range of about 500° to about 1000° F. The time required for reduction of noble metals is generally short, generally not more than an hour, or at least no more than 1 to 4 hours.

Following the reduction, the catalyst can be sulfided, if necessary, or desirable, by contact with a sulfide, generally hydrogen sulfide or compound which will produce hydrogen sulfide in situ. The sulfiding step is particularly desirable inasmuch as sulfiding can significantly improve the activity and selectivity of certain types of platinum catalysts. The contact of a hydrogen sulfide-containing gas with the catalyst serves a number of functions, and has a profound influence on the reforming performance of the catalyst. In sulfiding the catalyst, the catalyst is contacted with a dilute gaseous solution, e.g., about 50 to about 5000 ppm, preferably about 1000 to about 3000 ppm, of hydrogen sulfide in hydrogen, or hydrogen plus other nonreactive gases. The contact is conducted at about 500° to about 1000° F., preferably from about 700° to about 950° F., and is continued until hydrogen sulfide is detected in the effluent gas. Such treatment incorporates from about 0.001 to about 2 weight percent, and preferably from about 0.01 to about 0.15 weight percent sulfur on the catalyst.

Essentially any hydrocarbon fraction containing paraffins, naphthenes, and the like, admixed one with the other or in admixture with other hydrocarbons, can be converted by means of the catalysts of this invention. A suitable feed, e.g., either virgin or cracked, Fischer-Tropsch or mixtures thereof, is contacted at reforming conditions in the presence of hydrogen (once-through, or recycle) with a catalyst composite including an alpha alumina support which contains catalytically active amounts of the metals. Typical feed stream hydrocarbon molecules are those containing from about 5 to about 12 carbon atoms, or more preferably from about 6 to about 12 carbon atoms, or more preferably from about 7 to about 10 carbon atoms. Naphthas, or petroleum fractions, boiling within the range of from about 80° to about 450° F., and preferably from about 125° to about 375° F., contain hydrocarbons or carbon numbers within these ranges. Typical fractions thus usually contain from about 20 to about 80 volume percent of paraffins, both normal and branched, which fall in the range of about $C_5$ to $C_{12}$, and from about 20 to about 80 volume percent of naphthenes boiling within the range of about $C_6$ to $C_{12}$. Typical feeds generally contain from about 5 through about 20 volume percent of aromatics which boil within the range of about $C_6$ to $C_{12}$, typically as produced in the product from the naphthenes and paraffins.

It is desirable, for best results with some catalyst systems, that the feed contain a small amount of sulfur. Preferably, the feed shall contain from about 0.05 to about 10 parts, per million parts of feed (ppm), and more preferably from about 0.2 to about 2.0 ppm of sulfur.

Reforming reactions are suitably conducted at temperatures ranging from about 600° to about 1050° F., and preferably at temperatures ranging from about 850° to about 1000° F. Pressures range generally from about 50 to about 750 psig, and preferably from about 100 to about 500 psig. The reactions are conducted in the presence of hydrogen to suppress side reactions normally leading to the formation of unsaturated carbonaceous residues, or coke, which deposits upon and causes deactivation of the catalyst. The hydrogen rate, once-through or recycle, is generally within the range of from about 1000 to about 10,000 SCF/Bbl, and preferably within the range of from about 2000 to about 6000 SCF/Bbl. The feed stream, in admixture with hydrogen, is passed over beds of the catalyst at space velocities ranging from about 0.1 to about 25 W/W/Hr., and preferably from about 0.5 to about 5.0 W/W/Hr.

In the reforming reaction, the catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and reheat between stages. The reactor effluent is passed through a liquid-gas separating system from which the fixed gases which usually approximate upwards of about 50 percent hydrogen are recovered for recycle. The liquid products then are fractionated in the usual way for recovery of a stabilized gasoline reformate or for recovery of the selected aromatic hydrocarbons.

The invention will be more fully understood by reference to the following selected nonlimiting examples and comparative data which illustrate its more salient features. All parts are given in terms of weight except as otherwise specified.

Several portions of high surface area alpha alumina were prepared and, for demonstrative purposes, platinum reforming catalysts were prepared from portions of particulate high surface area alpha alumina. In the preparation of these catalysts, portions of the alumina were impregnated with solutions of chloroplatinic acid, treated and activated and then employed as catalysts in a series of representative reforming reactions.

These series of catalysts were each evaluated in a continuously operated reactor for reforming naphtha at essentially the same conditions of temperature, pressure and hydrogen rate.

EXAMPLE 1

(Preparation of High Surface Area Alpha Alumina)

Diaspore (Missouri grey diaspore) was crushed and sieved to 14/35 mesh, the size desired for testing as a catalyst base. Approximately 0.75 g. of the 14/35 mesh material was placed in a Vycor flask which was connected by a large diameter tube to a vacuum pump with appropriate gauges, temperature measuring devices, etc. The flask was then slowly (over a period of 1 week) heated to 300° C. by a heating mantle, the time being determined such that the pressure was never higher than $5 \times 10^{-4}$ Torr. The heating mantle was removed and the sample heated with a bunsen burner flame (again slowly enough that the pressure stayed below $5 \times 10^{-4}$ Torr), with numerous periods of cooling, up to 340° C. This procedure, which was repeated several times, yielded alpha alumina having a surface area of 168 m²/g (B.E.T.) suitable for use as catalyst base material.

The x-ray diffraction pattern obtained on the specimen, shown to be alpha alumina is as follows:

| dA | I |
|---|---|
| 3.47 | 50% |
| 2.55 | 84% |
| 2.376 | 46% |
| 2.083 | 100% |
| 1.736 | 34% |
| 1.598 | 80% |
| 1.545 | 3% |
| 1.508 | 6% |
| 1.403 | 34% |
| 1.373 | 48% |

In obtaining the X-ray powder diffraction pattern, standard procedures were employed. The radiation source was the K-alpha doublet for copper. A Geiger counter spectrometer with a multichannel analyzer was used in recording the data. The peak heights I, and the positions as a function of 2 0, where 0 is the Bragg angle, were read from the spectrometer chart. From these, the relative intensities I were observed. Also, the interplanar spacing, $d$, in Angstrom units, corresponding to the recorded lines, were determined by reference to standard tables. In the above table, the more significant interplanar spacings corresponds with accepted $d$ values for alpha alumina. The relative intensities of the lines are expressed as a percentage of the highest peak.

The stability of this material was such that additional subsequent heating in air containing reasonably high water vapor concentrations, once the material had been prepared, did not cause significant loss of surface area at temperatures of typical catalytic processes, and considerably above the temperatures required for reforming. The results of calcining in air (containing about 25 Torr water vapor partial pressure) at several temperatures for 235 hours is shown in Table I, below:

TABLE I

| Surface Area Starting $\alpha$-Al$_2$O$_3$ | Temperature (235 Hr. Heating) in Air | Final Surface Area |
|---|---|---|
| 168 m$^2$/g | 1000° F. | 165 m$^2$/g |
| | 1100° F. | 162 m$^2$/g |
| | 1200° F. | 151 m$^2$/g |

EXAMPLE 2

(Use of High Surface Area Alpha Alumina as a Reforming Catalyst Base)

A 0.50 g portion of the alpha alumina of Example I was impregnated by adsorption from dilute solution with 1.5 mg of platinum as chloroplatinic acid containing 1.7 mg of chlorine, and 1.3 mg of chloride added as hydrochloric acid diluted to 2.0 ml. After drying in a vacuum oven at 200° C., calcining in N$_2$ at 950° F., and reducing in H$_2$ at 950° F., the catalyst was then tested for reforming (specifically with n-heptane feed for dehydrocyclization) under standard conditions, and compared, at similar conditions, with a standard commercial reforming catalyst similar to the alpha alumina catalyst, except that the base on which the platinum and chloride were deposited was gamma alumina of slightly higher surface area. A number of advantages were observed with regard to the alpha alumina catalyst vis-a-vis the gamma alumina catalyst. The results are described by the data presented in the following Table II:

TABLE II

Conditions:
n-heptane feed, 200 psig, 925° F. (isothermal),
~1 V/Hr./V feed rate, 8:1 H$_2$/HC ratio, 0.50 ml
catalyst prereduced, GC analysis of 200 psig
liquid product.

| | Pt on $\alpha$-Al$_2$O$_3$ | | Pt on $\gamma$-Al$_2$O$_3$ | |
|---|---|---|---|---|
| Catalyst Identification: | 0.3% Pt, 0.6% Cl | | 0.3% Pt, 0.6% Cl | |
| Catalyst Age (Hrs.) | 25 | 49 | 25 | 49 |
| Product Distribution, Wt.% | | | | |
| Aromatics | 24.38 | 20.69 | 22.91 | 19.85 |
| n-C$_7$ | 1.79 | 3.02 | 1.99 | 2.45 |
| C$_7$ Isomers (-nC$_7$) | 6.69 | 5.63 | 4.66 | 4.07 |
| C$_6$ | 8.42 | 9.96 | 6.24 | 7.36 |
| C$_4$ | 41.31 | 39.27 | 44.90 | 42.95 |

The results show that the surface area of the high surface area $\alpha$-alumina is quite stable, once formed, and catalysts formed therefrom have improved selectivity and activity. The new catalyst support thus has new and useful properties as a reforming catalyst base. Specifically, even at the ~168 m$^2$/g surface area level, the alpha alumina platinum reforming catalyst (compare with the ~210 m$^2$/g for the standard catalyst) provided yields which were better than the higher surface area standard catalyst. In addition, the dehydrocyclization activity toward n-heptane (a notoriously difficult material to dehydrocyclize) was better.

EXAMPLES 3 and 4

(Preparation of High Surface Area Alpha Alumina)

Two 10-gram portions of mineral beta alumina monohydrate (Missouri grey diaspore) were charged, in separate runs, into a multi-walled Vycor concentric tube furnace provided with a heating coil on an outer tube. The inside tube, which contained the bed of alumina, was of 5 mm inside diameter. In a first run, nitrogen, and in a second run, hydrogen, was passed downwardly over the beds of beta alumina monohydrate at a rate of 3.2 liters/minute. A temperature of 300° C. was maintained for the first 36 hours, a temperature of 400° C. for the next consecutive 6 hours, and finally the temperature was raised to 500° C. and maintained for 1 hour. The surface area of the $\alpha$-alumina that was produced, the specimens being taken from the top and bottom of the beds, respectively, analyzed as follows:

| Carrier Gas | Nitrogen | Hydrogen |
|---|---|---|
| Surface Area (B.E.T.) | | |
| Top of Bed | 144 m$^2$/g | 162 m$^2$/g |
| Bottom of Bed | 113 m$^2$/g | 137 m$^2$/g |

It is apparent that various modifications and changes can be made without departing the spirit and scope of the present invention. For example, the ambient gas employed can be virtually any nonreactive or inert gas, although hydrogen and helium or mixture of these and other gases are more effective in producing the desired surface area. The pressure can range from supra atmospheric pressures to sub atmospheric pressures, the latter being preferable. The gas can be provided at static conditions or employed as a sweep. Low water vapor pressure can be maintained by various methods known to the art. Desiccants can be employed within the gas phase or maintained to purge a stream of gas prior to its contact with the hydrated beta alumina.

Having described the invention, what is claimed is:

1. A reforming catalyst comprising a halogenated composite of alpha alumina of surface area ranging about 100 m$^2$/g to about 600 m$^2$/g, and a Group VIII noble metal in concentration ranging from about 0.1 to about 10 percent, halogen in concentration ranging from about 0.3 to about 1.5 percent.

2. The catalyst of claim 1 wherein the Group VIII noble metal is platinum.

3. The catalyst of claim 2 wherein the platinum ranges from about 0.1 to about 1 percent.

4. The catalyst of claim 2 wherein the composite comprises from about 0.1 to about 2.5 percent halogen.

5. The catalyst of claim 2 wherein the halogen is chlorine.

6. The catalyst of claim 1 wherein the surface area ranges from about 150 m$^2$/g to about 400 m$^2$/g.

7. The catalyst of claim 4 wherein the composite contains from about 0.3 to about 1.5 percent halogen.

8. The catalyst of claim 7 wherein the halogen is chlorine.

9. The catalyst of claim 1 in sulfided form and containing up to about 2 percent sulfur.

* * * * *